United States Patent Office 2,966,584
Patented Dec. 27, 1960

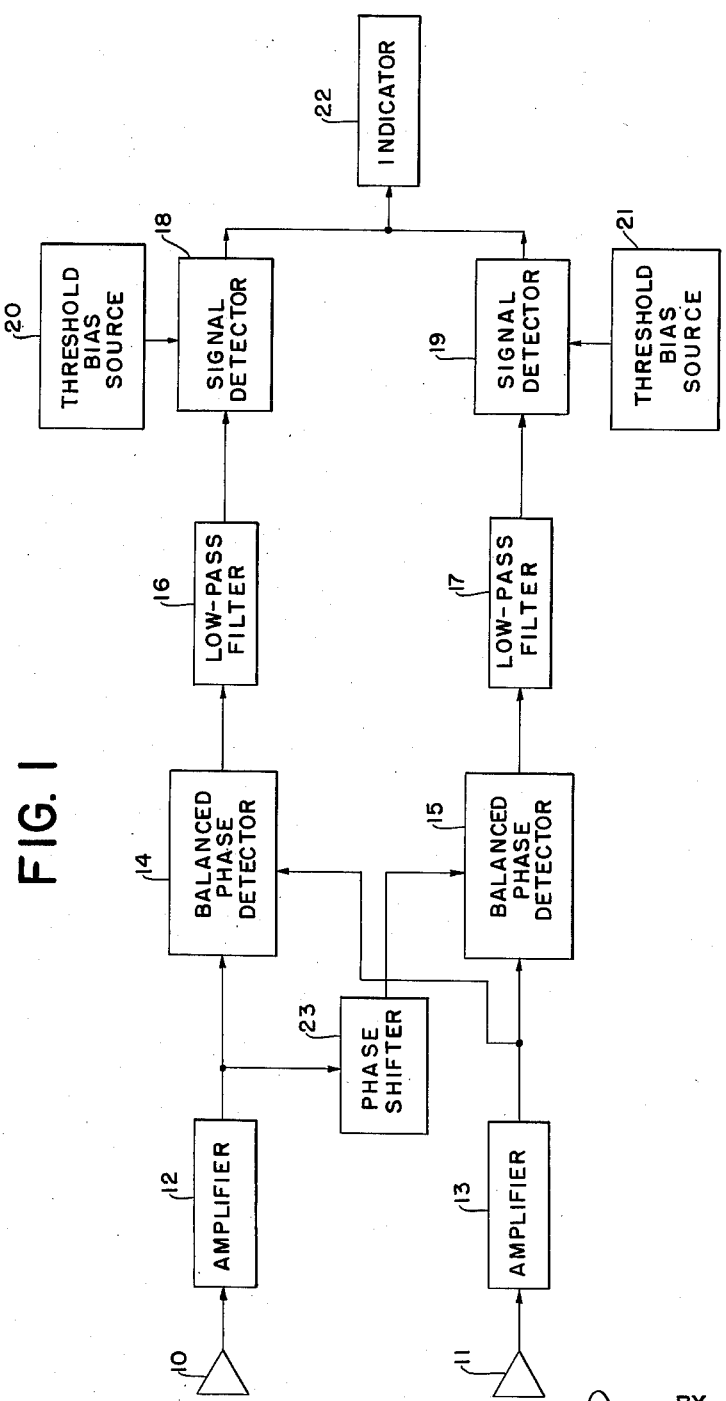

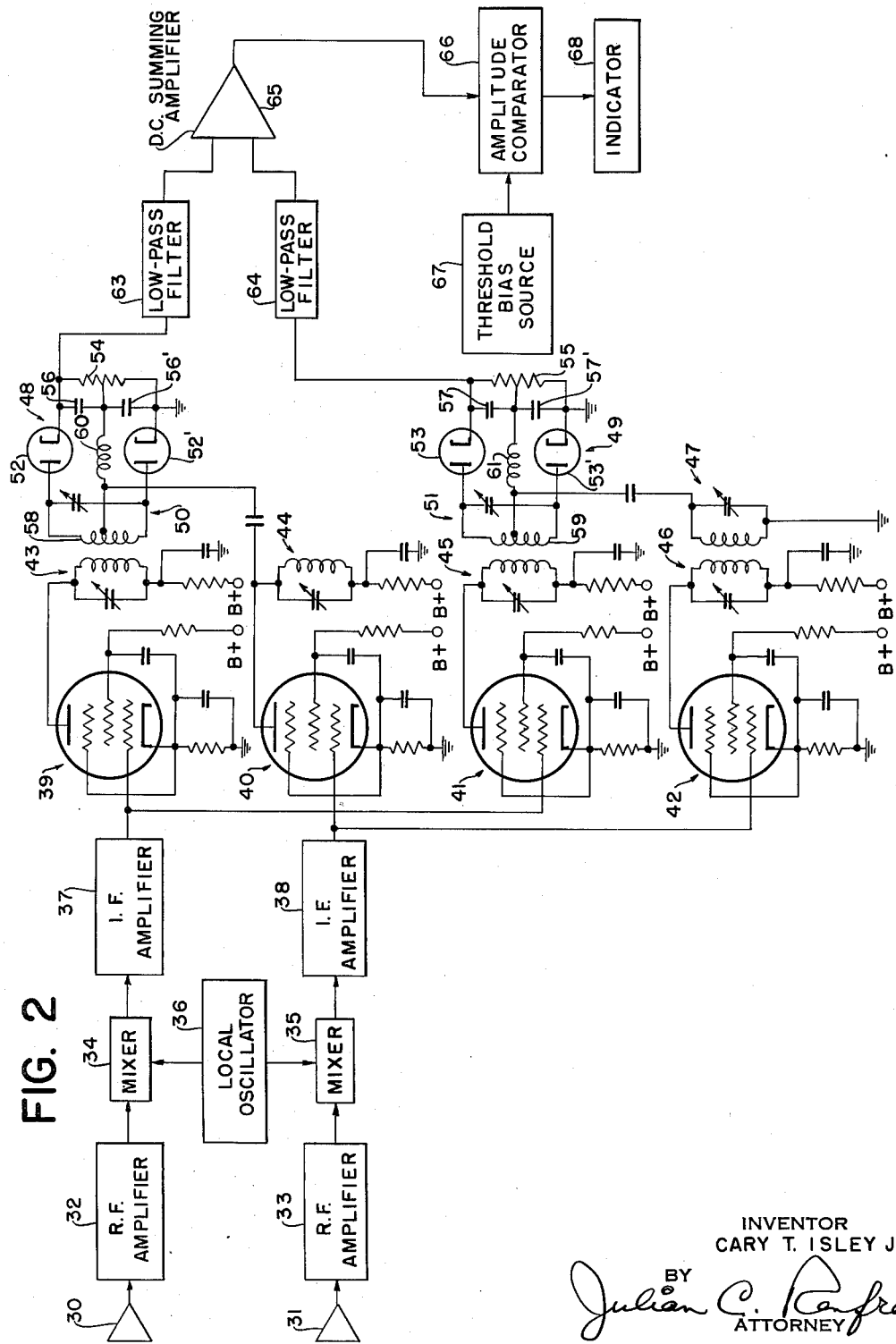

2,966,584

RECEIVING SYSTEMS

Cary T. Isley, Jr., Los Angeles, Calif., assignor to The Martin Company, a corporation of Maryland Filed May 13, 1957, Ser. No. 658,555

8 Claims. (Cl. 250—20)

The present invention relates to electrical receiving systems, and more particularly to an electrical receiving system adapted to detect signals of low magnitude compared to that of noise inherent within the system.

Receiving systems conventionally include an antenna unit, an amplifier unit, and a detector unit. The lowest magnitude signal detectable with such a system is to a large degree determined by the internal noise generated within the system, as is well understood.

A receiving system may be adapted to detect a signal having a magnitude below that of the system's internal noise by applying the output of the detector unit to a low-pass filter network having a long integration time constant, or narrow band width. In the absence of a signal the detector unit rectifies the predetection noise generated in the antenna and amplifier units. The low-pass filter operates to average this rectified noise output, thus producing a D.C. voltage representative of the noise bias level. The introduction of a signal into the system will then produce a small percentage variation in the filter D.C. voltage output, which variation provides a means of signal detection.

Theoretically, the above-described system has a capability for detection limited only by the integration time provided in the filter design. In practice, however, the ratio of the change in bias level due to the signal relative to the bias level established by the system noise is approximately proportional to the square of the predetection signal-to-noise ratio. Thus, for example if the integration time of the filter were sufficient to permit detection of a signal 20 db below system noise, the change in bias level would be in the order of one percent. Small changes in predetection gain or a slight shift in detection transfer parameters would therefore offset the delicate bias level balance required for signal detection. The reliable detection of a low-magnitude signal relative to internal system noise is for this reason not feasible with this system.

It is the object of the present invention to improve upon the electrical receiving system described above so that the detection of low magnitude signals relative to internal system noise may be reliably effected without the impractical requirement of establishing and maintaining a highly accurate noise bias level. To this end, the system of the present invention provides circuitry adapted to apply to the post-detection filter a noise output voltage having a zero average value regardless of the magnitude of predetection noise in the system.

Accordingly, the invention comprises two receiving channels, each channel having a separate antenna and amplifier circuit. Detection is provided by an amplitude-sensitive, balanced phase detector circuit which has a discriminator input arm comprising a parallel inductor-capacitor circuit and a tap input arm at substantially the midpoint of the inductor element in the discriminator input arm. The discriminator input arm is inductively coupled to the output of one of the amplifier circuits while the tap input arm has a connection therefrom to the output of the other of the amplifier circuits. Thus the outputs of both amplifier circuits are coupled into the balanced phase detector. A low-pass filter network is coupled to the output of the phase detector circuit.

The system thus described operates in the following manner. With a signal present in the receiving system the output of each amplifier circuit contains a signal component and a noise component. The antenna and amplifier units can be readily designed so that the noise component out of one channel is effectively uncorrelated with respect to the noise component out of the other. On the other hand, since each antenna receives the same incoming signal the signal components will be substantially correlated.

The noise components and signal components output of both amplifiers are then coupled into the balanced phase detector circuit. The phase detector operates to effect a multiplication of its input voltages. The multiplication of the uncorrelated noise components results in the production of a rectified noise output voltage having a zero average value. On the other hand, the multiplication of the correlated signal components produces a rectified signal output voltage having some finite average value. These noise and signal output voltages are then applied to the low-pass filter. The filter operates to produce an output voltage equal to the average of its input voltage. Thus, the presence of a filter output voltage will be indicative of signal reception by the system.

In the event that the phase difference between the two antennas in the receiving system is such that the signals at the inputs of the phase detector circuit are 90° out of phase, cancellation of these signals within the phase detector will occur. To insure signal detection the present invention is advantageously provided with a second balanced phase detector circuit. The discriminator and tap input arms of this phase detector are connected to the output of a different amplifier respectively, a phase shifter network being provided in the tap input arm connection. With this arrangement at least one of the phase detector circuits will produce a rectified signal output voltage regardless of the phase difference between the incoming signals.

The invention will now be described in detail in connection with the accompanying drawings, in which:

Fig. 1 is a block diagram of an electrical receiving system embodying the invention; and Fig. 2 is a schematic diagram of an electrical receiving system embodying the invention, and including a circuit diagram of the phase detectors employed.

In Fig. 1 the predetection circuitry of the receiving system includes a pair of receiving channels, each channel having an antenna 10, 11 and an amplifier circuit 12, 13. Each antenna operates as a signal pick-up device independently of the other. The output of each amplifier circuit therefore consists of an amplified signal component, and a noise component generated by its circuitry and the associated antenna. The signal components of both amplifier circuit outputs are substantially correlated due to the fact that the same signal information is received by each antenna. With proper design and operation of the receiving channels the noise components will be effectively uncorrelated with respect to each other.

The detection circuitry of the receiving system comprises a pair of amplitude-sensitive balanced phase detector circuits 14 and 15. Each balanced phase detector circuit has a pair of input arms, which input arms are coupled respectively to the output of a different one of the amplifier circuits. Thus each phase detector receives noise and signal component outputs from both amplifier circuits. The phase detector operates to effect a multiplication of its input voltages.

In the absence of an incoming signal the output of each phase detector circuit is a resultant rectified voltage derived from a multiplication of the noise components from both amplifier circuits. If these noise components are effectively uncorrelated the average value of this resultant voltage will be equal to zero. Conventional amplifier noise is of the shot type generated by the vacuum tubes and crystals employed and is completely uncorrelated. Any correlation is therefore due almost entirely to the resistance component of mutual impedance between the two antennas. The mutual impedance between antennas may be kept arbitrarily small by reasonable geographical separation and/or proper pattern design.

On the other hand, the signal output components of both amplifier circuits are substantially correlated. The rectified output voltage of each phase detector circuit derived from a multiplication of the correlated signal components will therefore have some finite average value.

The outputs of the phase detector circuits are then applied to the post-detection circuitry which includes a pair of low-pass filters 16 and 17, individually coupled to the output of a phase detector circuit. The longer the integrating time of a low-pass filter the closer its output voltage approaches the average of its input voltage. Thus, detectability of a signal in the output of the low-pass filter is a function of the integrating time, or narrowness of bandwidth, permissible in the filter design. The maximum integrating time limit of the low-pass filter is primarily established by the receiving system application. For example, if the signal input to the receiver is derived from a scanning radar unit, the signal will be available for a finite period of time only. Accordingly, an upper limit is set on the permissible integrating time of the filter.

The remainder of the post-detection circuitry is adapted to indicate the presence of a signal in the receiving system. This circuitry includes signal detectors 18 and 19, which are, in essence, simple threshold devices. Each signal detector has two inputs, one being the output voltage of its associated low-pass filter, and the other being a threshold bias voltage generated by an associated bias source, 20 or 21. The magnitude of the bias voltage is determined by the filter's D.C. output level in the absence of a signal input. Advantageously, an additional small increment is added to each bias voltage as a safety factor to insure that transient perturbations are not mistaken for incoming signals. Each signal detector is adapted to produce an output voltage whenever the low-pass filter output voltage exceeds the threshold bias voltage, this variation being indicative of a received signal within the system. The output voltages from the signal detectors are applied to indicator 22 which is adapted to produce a display indicative of the presence of the received signal.

It should be noted that signal detection can be effected in the receiving system in the absence of one of the detector circuits and the post-detection circuitry associated therewith, that is, in the absence of components 15, 17, 19, and 21, for example. This additional circuit group in combination with phase shifter circuit 23, is included to insure signal detection by at least one of the phase detector circuits regardless of the phase difference between the signal outputs of the amplifier circuits. The operation of this portion of the circuitry is more fully explained in the following description relative to Fig. 2.

In Fig. 2, the predetection circuitry is of the conventional superheterodyne type and comprises R.F. amplifiers 32, 33, mixers 34, 35, a common local oscillator 36, and I.F. amplifiers 37, 38. Geographically-spaced antennas 30 and 31 are coupled respectively to R.F. amplifiers 32 and 33. Local oscillator noise should be balanced out in each amplifier circuit to prevent any noise correlation due to the common local oscillator interconnection.

Each I.F. amplifier has a separate pair of output stages. Each output stage includes a pentode vacuum tube, 39, 40, 41, 42, and a parallel inductor-capacitor output circuit 43, 44, 45, 46, connected as a load impedance to the pentode. The output circuits are tuned to the frequency of the signal coupled thereinto, in this case the I.F. frequency of the superheterodyne receiver.

One of the output stages differs from the other in that it also includes a phase shifter circuit 47 comprising a parallel inductor-capacitor circuit inductively coupled to the output circuit 46 of that stage. The phase shifter circuit is also tuned to the I.F. frequency.

The pair of amplitude-sensitive, balanced phase detector circuits, 48 and 49, employed in the illustrated embodiment are shown in circuit form. Each includes a frequency discriminator network 50, 51, which comprises a parallel inductor-capacitor circuit. The anodes of a pair of rectifier elements, diodes 52—52', 53—53', are connected respectively to the opposite ends of the discriminator network. The cathodes of the rectifier diodes have an output resistor, 54, 55, connected therebetween. A pair of capacitors 56—56', 57—57', are connected in series between the rectifier cathodes, in parallel with the output resistor. Each phase detector is balanced by means of a D.C. connection from a point between the capacitors to a tap substantially at the midpoint of the inductor element, 58, 59, in the discriminator network. A choke, 60, 61, is included in this connection.

The discriminator network of each phase detector acts as one of its input arms, while the center tap to the inductor element in the discriminator network acts as another input arm. The discriminator and tap input arms of each phase detector are coupled respectively and individually to an output stage of a different one of the amplifier circuits. Each discriminator input arm is inductively coupled to the output circuit of its associated output stage, the discriminator networks being tuned to the frequency of the signal coupled thereinto. Each tap input arm has a connection therefrom to the output end of its associated output stage, one of the taps being connected to the output end of output circuit 44, while the other, that of inductor 59, is coupled to the output end of phase shifter circuit 47.

The operation of the described phase detectors is well known in the art. The action is such that the output voltage developed across its load resistor is equal to the multiple of the input voltages applied to its discriminator and tap input arms. If, however, there is a 90° phase difference between the signals applied to the input arms of the phase detector, a balancing-out takes place such that no output voltage is developed across its output resistor. It is to insure against such a 90° phase relationship existing in both phase detectors at the same time that phase shifter circuit 47 is provided. Advantageously circuit 47 is adapted to introduce a phase shift of 90°.

The particular phase detector coupling arrangement illustrated in Fig. 2 is not necessarily the only one that may be employed. It is only required that the coupling arrangement be adapted to apply the output voltages from both amplifier circuits to each phase detector circuit.

The post-detection circuitry again comprises a pair of low-pass filters, 63 and 64. However, in this embodiment the outputs of the low-pass filters are coupled into a summing amplifier 65 and then applied to an amplitude comparator circuit 66. A threshold bias voltage is introduced into amplitude comparator circuit 66 by means of threshold bias source 67. The amplitude comparator functions to compare its two input voltages and to produce an output voltage whenever the threshold bias voltage is exceeded by the output of the summing amplifier 65. This output voltage is applied to indicator 68 and is indicative of a received signal.

A preferred embodiment of the invention has been described. Various circuit changes and modifications may be made within the scope of the invention as set forth in the appended claims.

I claim:

1. An electrical receiving system for detecting signals of low magnitude compared to that of noise within the system comprising a pair of amplifier circuits, a separate antenna for each said amplifier circuit, a pair of amplitude-sensitive, balanced phase detector circuits, a separate discriminator input arm comprising a parallel inductor-capacitor circuit, and a tap input arm at substantially the midpoint of the inductor in the said discriminator input arm for each said detector circuit, said discriminator and tap input arms of each said balanced phase detector circuit being coupled respectively to the output of a different one of said amplifier circuits, each said discriminator input arm being inductively coupled to its associated amplifier output, each said tap input arm having a connection therefrom to its associated amplifier output, a phase shifter circuit in one of said tap input arm connections, low-pass filter circuit means coupled to the outputs of said phase detector circuits for producing a voltage derived from an averaging of the output voltages from said phase detector circuits, whereby a voltage threshold level representative of the average of that component of the phase detector output voltages due to noise is established at the output of said filter circuit means, and signal detecting circuit means coupled to the output of said low-pass filter circuit means and adapted to detect voltage variations in the output of said filter circuit means which exceed the said voltage threshold level, said voltage variations being indicative of a received signal.

2. An electrical receiving system in accordance with claim 1 in which the said discriminator input arms are tuned to the frequency of the signal inductively coupled thereinto, and the said phase shifter circuit is adapted to produce a phase shift of approximately 90°.

3. An electrical receiving system for detecting signals of low magnitude compared to that of noise within the system comprising a pair of amplifier circuits, a separate antenna for each said amplifier circuit, a pair of amplitude-sensitive, balanced phase detector circuits, a separate discriminator input arm comprising a parallel inductor-capacitor circuit, and a tap input arm at substantially the midpoint of the inductor in the said discriminator input arm for each said detector circuit, said discriminator and tap input arms of each said balanced phase detector circuit being coupled respectively to the output of a different one of said amplifier circuits, each said discriminator input arm being inductively coupled to its associated amplifier output, each said tap input arm having a connection therefrom to its associated amplifier output, a phase shifter circuit in one of said tap input arm connections, a pair of low-pass filter circuits coupled respectively to the output of a different one of said phase detector circuits, a summing amplifier circuit coupled to the outputs of said low-pass filter circuits, signal detecting circuit means comprising a threshold bias source adapted to produce a voltage at least equal in magnitude to the output voltage of said summing amplifier with a signal absent from the receiving system, and an amplitude comparator circuit connected to the output of said threshold bias source and to the output of said summing amplifier circuit, and adapted to produce an indication when the voltage from said summing amplifier circuit exceeds the voltage from said threshold bias source, said indication being representative of a received signal.

4. An electrical receiving system for detecting signals of low magnitude compared to that of noise within the system comprising a pair of amplifier circuits, a separate antenna for each said amplifier circuit, a separate pair of output stages for each said amplifier circuit, each of which said stages comprises a parallel inductor-capacitor output circuit, and one of which said stages includes a phase shifter circuit comprising a parallel inductor-capacitor circuit inductively coupled to the output circuit of that said stage, a pair of amplitude-sensitive, balanced phase detector circuits, a separate discriminator input arm comprising a parallel inductor-capacitor circuit, and a tap input arm at substantially the midpoint of the inductor in the said discriminator input arm for each said detector circuit, said discriminator and tap input arms of each said balanced phase detector circuit being coupled respectively and individually to an output stage of a different one of the said amplifier circuits, each said discriminator input arm being inductively coupled to the output circuit of its associated output stage, one of said tap input arms being connected to the output circuit of its associated output stage, and the other of said tap input arms being connected to the said phase shifter circuit, low-pass filter circuit means coupled to the outputs of said phase detector circuits for producing a voltage derived from an averaging of the output voltages from said phase detector circuits, whereby a voltage threshold bias level representative of the average of that component of the phase detector output voltages due to noise is established at the output of said filter circuit means, and signal detecting circuit means coupled to the output of said low-pass filter circuit means and adapted to detect voltage variations in the output of said filter circuit means which exceed the said voltage threshold level, said voltage variations being indicative of a received signal.

5. An electrical receiving system in accordance with claim 4 in which all of the parallel inductor-capacitor circuits are tuned to the frequency of the signal applied thereto, and the said phase shifter circuit is adapted to produce a phase sift of approximately 90°.

6. A receiving system for detecting the presence of signals having a magnitude less than the noise of said system comprising a pair of amplifier sections, a pair of antennae each connected to a respective one of said amplifier sections, a pair of balanced phase detector circuits, first and second pairs of coupling means each associated with a respective one of said amplifier sections, the coupling means of any one of said pairs each connecting the output signals of the said amplifier section associated therewith to a respective one of said detector circuits, said balanced phase detector circuits each being designed for correlating signals directly related to the signals introduced to said antennae while effectively blocking the passage therethrough of the uncorrelated noise introduced to said detectors, at least one of said coupling means including phase shifting means for ensuring that a correlated output signal will be produced by at least one of said detector circuits whenever signals are introduced to said antennae, and a pair of low-pass filters each connected to a respective one of said detector circuits for averaging the output signals thereof, whereby output levels from at least one of said low-pass filters other than the static level thereof will indicate the presence of received signals at said antennae despite phase differences between the received signals.

7. A receiving system in accordance with claim 6 which includes indicating means connected to provide an indication whenever the output level of at least one of said low-pass filters is other than the static level thereof.

8. A receiving system in accordance with claim 7 which includes threshold biased means connected for preventing actuation of said indicating means by minor perturbations of the low-pass filter outputs while allowing actuation thereof when signals are received by said antennae.

References Cited in the file of this patent

UNITED STATES PATENTS

| 2,042,831 | Crosby | June 2, 1936 |
| 2,166,991 | Guanella | July 25, 1939 |
| 2,262,931 | Guanella | Nov. 18, 1941 |
| 2,349,407 | Crosby | May 23, 1944 |

(Other references on following page)

UNITED STATES PATENTS

| | | |
|---|---|---|
| 2,364,952 | Crosby | Dec. 12, 1944 |
| 2,423,229 | Crosby | July 1, 1947 |
| 2,580,148 | Wirkler | Dec. 25, 1951 |
| 2,638,540 | Toth | May 12, 1953 |
| 2,800,654 | De Rosa | July 23, 1957 |
| 2,840,308 | Van Horne | June 24, 1958 |

OTHER REFERENCES

S. F. George: "Effectiveness of Crosscorrelation Detectors," Proceedings of the National Electronics Conference, vol. X, 1954, pages 109 to 118.

Brown & Twiss: "Correlation Between Photons in Two Coherent Beams of Light," Nature, Jan. 7, 1956, pages 27 to 29.